United States Patent [19]

Gooding et al.

[11] Patent Number: 4,459,129

[45] Date of Patent: Jul. 10, 1984

[54] WATER DISPERSIBLE HOT MELT SIZE AND YARN SIZED THEREWITH

[75] Inventors: Leon B. Gooding, Bolingbrook; Orville E. Brown, Elk Grove Village, both of Ill.

[73] Assignee: Borden, Inc., Columbus, Ohio

[21] Appl. No.: 518,678

[22] Filed: Jul. 29, 1983

[51] Int. Cl.³ .................. D06Q 1/02; B32B 27/30; C08L 93/04

[52] U.S. Cl. .................. 8/115.6; 524/272; 524/313; 524/334; 524/475; 524/516; 524/522

[58] Field of Search .......... 524/272, 313, 334, 475, 524/516, 522; 8/115.6

[56] References Cited

U.S. PATENT DOCUMENTS

| | | | |
|---|---|---|---|
| Re. 30,474 | 1/1981 | Malpass et al. | 428/253 |
| 3,120,452 | 2/1964 | Moser et al. | 117/138.8 |
| 3,161,538 | 12/1964 | Azorlosa et al. | 117/139.5 |
| 3,485,783 | 12/1969 | Kehe | 524/272 |
| 3,514,365 | 5/1970 | Burnett et al. | 161/89 |
| 3,546,008 | 12/1970 | Shields et al. | 117/138.8 |
| 3,644,591 | 2/1972 | Wolf et al. | 260/895 |
| 3,778,398 | 12/1973 | Mestetsky | 260/28.5 R |
| 3,823,108 | 7/1974 | Bissot | 524/272 |
| 3,854,990 | 12/1974 | Corey et al. | 117/139.5 A |
| 4,076,661 | 2/1978 | Kassner | 260/17 R |
| 4,089,832 | 5/1978 | Yamauchi et al. | 260/29.6 WA |
| 4,289,669 | 9/1981 | Lakshmanan | 524/272 |
| 4,325,853 | 4/1982 | Acharya et al. | 524/272 |
| 4,331,576 | 5/1922 | Colon et al. | 524/272 |
| 4,358,557 | 11/1982 | Boggs | 524/272 |
| 4,367,113 | 1/1983 | Karim et al. | 156/327 |

*Primary Examiner*—H. S. Cockeram
*Attorney, Agent, or Firm*—Robbins & Laramie

[57] ABSTRACT

A water dispersible hot melt size for sizing yarn is disclosed. The hot melt size comprises a combination of an alkenyl succinic anhydride, a non-blocking agent, a tackifying resin, a water-soluble polymer, and an ethylene-acidic monomer copolymer. The hot melt size may optionally contain a carboxylic acid and an antioxidant.

20 Claims, No Drawings

WATER DISPERSIBLE HOT MELT SIZE AND YARN SIZED THEREWITH

BACKGROUND OF THE INVENTION

The invention relates to water dispersible compositions that are useful for melt sizing textile yarns. The hot melt size compositions are removable from sized yarns by aqueous means.

The art of textile sizing contains many examples of solutions and dispersions of sizes in water and/or organic solvents. Examples of such sizings are shown in U.S. Pat. Nos. 3,546,008 and 3,644,591. The sizing material has generally been applied by passing the yarn through a bath containing the sizing product. The water or solvent is then evaporated. As the yarn is dried, this size will often bond together adjacent ends. The sized ends are then separated mechanically by means of lease rods and combs with the goal of achieving separation of each yarn end from adjacent ends. This separation of bonded warp ends can significantly affect the quality of the size coating resulting in yarn hairiness, reduction in yarn strength, and reduced abrasion resistance.

In an effort to reduce the energy consumption and yarn hairiness, new sizing machines and new sizing compositions have been developed. One class of sizing compositions comprises the hot melt or melt sizes. Hot sizes have several advantages. These include:

(1) Reduced energy consumption. Since there is no water or solvent to be removed from the yarn, the energy required for hot melt application is about 80% less than that needed for conventional aqueous sizing.

(2) Elimination of size cooking and size dumping. There are no sizing solutions to prepare or to dump. A hot melt size can arrive from the sizing supplier in a form ready to use.

(3) Greater speed of application. Since there is no water or solvent to remove, the speed at which the hot melt sizing product can be applied is not limited by drying capacity.

(4) Improved quality of sized warp yarn. Spun yarns, sized by hot melt application with the grooved roll, offer exceptional fiber lay or reduced hairiness.

Several generations of hot melt sizes have been developed. A few examples are known of melt sizes which are based in general upon waxes and other water-insolubles. These sizes do not require removal of solvent during application. However, they often require the use of non-aqueous solvents for removal after the sized yarn has been processed.

Hot melt sizes have been developed which can be removed from the processed yarn by aqueous extraction. One such example is described in U.S. Pat. No. Re. 30,474. The hot melt sizing composition of this patent comprises an intimate combination of a film-forming thermoplastic polymer and a melt-compatible non-polymeric solid modifier and optionally a yarn lubricant. The composition is readily meltable, quick-setting and essentially water- or alkali-soluble. The melt modifier functions to reduce the viscosity of the polymer and to effect an increase in its setting rate. The thermoplastic polymer may be selected from the group comprising water-dispersible or water-soluble linear copolyesters, alkali-soluble acrylic or methacrylic copolymers, meltable and alkali-soluble vinyl acetate copolymers and water-soluble or alkali-soluble phosphate copolymers. The solid modifier may be selected from carboxylic acids, particularly aliphatic dicarboxylic acids, polyhydric alcohols, phenolic acids, polyhydric phenols, and partial esters of polycarboxylic acids.

Hot melt size compositions may be used in various ways. The preferred method of using these compositions involves the utilization of a grooved rotating roller which is heated while a block of the melt size is forced against the roller to be transferred to yarn passing through the grooves of the roller. Such a method is described in U.S. Pat. No. Re. 29,287.

Although hot melt sizes have greatly improved the sizing of textile yarn, it is desirable to develop new compositions which have better processing characteristics. Accordingly, the hot melt sizes of the present invention have improved processing characteristics. The hot melt sizes of the present invention are completely dispersible in water or dilute alkali, possess a low viscosity at lower operating temperatures of 270° F.–300° F., and have a significantly increased heat stability.

SUMMARY OF THE INVENTION

The hot melt sizing compositions of the present invention comprise a copolymer of ethylene and an acid monomer such as acrylic acid, an alkenyl succinic anhydride and a water-soluble polymer selected from the group comprising a copolymer of vinyl pyrrolidone and vinyl acetate, a copolymer of vinyl acetate and crotonic acid and a homopolymer of vinyl pyrrolidone. The compositions further comprise non-blocking agents and tackifying resins, and may also optionally contain additional ingredients such as carboxylic acids and antioxidants. It has been found that the presence of the vinyl pyrrolidone-vinyl acetate copolymer or the vinyl acetate-crotonic acid copolymer is critical for the composition to have the required hot water dispersibility. The alkenyl succinic anhydride is also important for increasing the water dispersibility. Examples of non-blocking agents include microcrystalline waxes, natural waxes, synthetic waxes, paraffin wax, Fischer-Tropsch waxes, and tallow. Examples of tackifying resins which may be used are hydrogenated or partially hydrogenated wood rosin. The carboxylic acids may include dicarboxylic acids and fatty acids.

The various ingredients are present in the compositions of the instant invention in the following proportions: 10%–30% by weight of a copolymer of ethylene and an acidic monomer; 2%–15% by weight of a vinyl pyrrolidone-vinyl acetate or a vinyl acetate-crotonic acid copolymer or a vinyl pyrrolidone homopolymer; 25%–45% by weight of an alkenyl succinic anhydride; 10%–25% by weight of a non-blocking agent, and 10%–30% by weight of a tackifying resin. If an antioxidant is present, it may be used in the amount of 0.2%–2% by weight. If a dicarboxylic acid or fatty acid is present, it is used in the amount of 1%–15%.

The hot melt sizing compositions of the present invention can be applied to synthetic or natural fibers according to procedures known in the art. These compositions have been found to be non-blocking, dilute alkali or water dispersible, of low viscosity, to have good adhesion to various natural and synthetic fibers, and to exhibit good glue pot stability.

DETAILED DESCRIPTION OF THE INVENTION

In traditional warp preparation, the sizing material has been applied by passing the yarn through a bath having the sizing product dissolved or dispersed in a liquid such as water or other chemicals. This method aids in uniform application of this sizing product to the yarn. Evaporation of that water or solvent on the sizing machine drying section requires that energy be expended.

As the warp yarns are dried, this size will often bond together adjacent ends. The sized ends are then separated mechanically by means of lease rods and combs with the goal of achieving separation of each yarn end from adjacent ends. This separation of bonded warp ends can significantly affect the quality of the size coating resulting in yarn hairiness, reduction in yarn strength, and reduced abrasion resistance.

To greatly reduce these problems, hot melt sizing was developed. Hot melt sizing is a complete departure from the traditional methods of warp size application. In general, hot melt sizing is accomplished during the warping process by application of a molten 100% active sizing material to warp yarns. This process generally results in the sized, originally extremely hairy single yarn being virtually free of protruding hairs, stronger, more abrasion-resistant, and more suitable for both knitting and weaving.

Hot melt sizes may be used in various ways well known in the art. However, a preferred way of using hot melt sizes involves utilizing a grooved roller rotating in a bath of molten hot melt which is transferred to yarn passing through the grooves of the roller. A suitable apparatus for use in the application of hot melt sizes and process for applying the hot melt sizes are shown in U.S. Pat. No. Re. 29,287.

The hot melt sizes of the present invention comprise a blend of a copolymer of ethylene and an acidic monomer, a water-soluble polymer, an alkenyl succinic anhydride, a non-blocking agent, and a tackifying resin. The hot melt size may optionally contain a carboxylic acid and preferably also contains an antioxidant. These various ingredients are present in the hot melt sizes in the following amounts (by weight):

| Component | Broad | Preferred |
|---|---|---|
| Ethylene/acidic monomer copolymer | 10–30% | 15–25% |
| Water-soluble polymer | 2–15% | 5–10% |
| Alkenyl succinic anhydride | 25–45% | 30–40% |
| Non-blocking agent | 10–25% | 12–20% |
| Tackifying resin | 10–30% | 15–25% |
| Carboxylic acid | 0–15% | 0–10% |
| Antioxidant | 0–2% | 0.5–1.0% |

The critical component in the present hot melt sizes is the water-soluble polymer. This polymer is required for the hot melt sizes to have the proper hot water or dilute alkali dispersibility. The water-soluble polymer is selected from the group comprising a vinyl pyrrolidone-vinyl acetate copolymer and a vinyl acetate-crotonic acid copolymer or a vinyl pyrrolidone homopolymer. The vinyl pyrrolidone-vinyl acetate copolymer comprises 50%–70% by weight of vinyl pyrrolidone and 30%–50% by weight of vinyl acetate, preferably 60% by weight of vinyl pyrrolidone and 40% by weight of vinyl acetate. The vinyl acetate-crotonic acid copolymer comprises 85%–95% by weight of vinyl acetate and 5%–15% by weight of crotonic acid, preferably 90% by weight of vinyl acetate and 10% by weight of crotonic acid. The water-soluble polymer comprises 2%–15% by weight, preferably 5%–10% by weight, of the hot melt sizes of the present invention.

The alkenyl succinic anhydride is also important for increasing the water-dispersibility of the hot melt sizes. This component is an adduct of maleic anhydride and an alkene having the formula

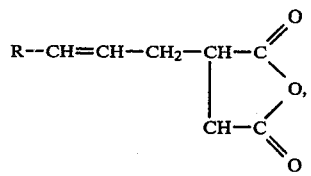

where R is an alkyl having 20 to 40 carbons. R may be a straight chain or branched chain. R is preferably mostly linear and has an average carbon number of 30 or more. One example is Versar ®300, trademark of A. Gross & Company. The alkenyl succinic anhydride comprises 25%–45% by weight, preferably 30%–40% by weight, of the instant hot melt sizes.

The third ingredient of the hot melt size compositions is the copolymer of ethylene and an acidic monomer. Suitable acidic monomers include acrylic acid, methacrylic acid, and the like. The acidic monomer is preferably acrylic acid. The ethylene-acidic monomer copolymer comprises 80%–98% by weight of ethylene and 2%–20% by weight of the acidic monomer, preferably 95% by weight of ethylene and 5% by weight of acidic monomer. The acid number of the copolymer should be no less than 40. The copolymer of ethylene-acidic monomer comprises 10%–30% by weight, preferably 15%–25% by weight, of the hot melt sizes.

A fourth component of the hot melt sizes is the non-blocking agent or lubricant. Conventional non-blocking agents can be utilized for this component. Suitable examples include, but are not limited to, microcrystalline waxes, synthetic waxes, natural waxes, paraffin wax, tallow, and Fischer-Tropsch waxes. One example of a Fischer-Tropsch wax is Paraflint H1 ® (trademark of Moore and Munger, Inc.). This component comprises 10%–25% by weight, preferably 12%–20% by weight, of the hot melt sizes.

The fifth ingredient is a tackifying resin. Conventional tackifying resins may be used and can be illustrated by a hydrogenated wood rosin, such as Foral-®AX (registered trademark of Hercules, Inc.), a partially hydrogenated wood rosin, such as Staybelite ® resin (registered trademark of Hercules, Inc.), wood gum, and tall oil rosins. The tackifying resin comprises 10%–30% by weight, preferably 15%–25% by weight, of the hot melt sizing compositions of this invention.

In addition, the hot melt sizes may optionally contain a carboxylic acid in an amount up to about 15% by weight. In other words, the hot melt sizes contain 0%–15% by weight, preferably 0%–10% by weight, of a carboxylic acid. Suitable carboxylic acids are the dicarboxylic acids and fatty acids. Suitable fatty acids have 12–30 carbon atoms and include stearic acid, margaric acid palmitic acid and oleic acid. Suitable dicarboxylic acids are aliphatic dicarboxylic acids having 5–15 carbon atoms and aromatic dicarboxylic acids having 8–30 carbon atoms. Examples include azaleic acid and phthalic acid. It is preferred to use stearic acid as the carboxylic acid.

And finally, the hot melt sizing compositions contain 0%–2% by weight, preferably 0.5%–1.0% by weight, of an antioxidant. Conventional antioxidants may be utilized in the present compositions. Examples of preferred antioxidants include distearyl pentaerythritol diphosphite and octadecyl 3-(3',5'-di-tertbutyl-4'-hydroxyphenyl)-propionate.

The hot melt sizing compositions of the present invention are prepared by blending the ingredients together while heating them. Generally, the alkenyl succinic anhydride, antioxidant (if present) and carboxylic acid (if present) are heated at 275° F. until the mixture melts enough to start mixing, which is thereafter continued throughout. A paddle-type, center agitator mixer can be utilized for mixing. The non-blocking agent, copolymer of ethylene-acidic monomer, and one-half of the water-soluble polymer are added. After the foam begins to subside, one-third to one-half of the tackifying resin is added. After the foam has died down, the remainder of the water-soluble polymer and tackifying resin is added. After the mixture has started melting, the temperature is reduced to 250° F. and mixing is continued. Once the composition has obtained a smooth blend, it is removed from the heat and allowed to cool into sticks, blocks, or other forms suitable for the application equipment. The composition is then ready for use in the hot melt sizing of yarn using the procedures described above.

Further details of the invention are shown in the examples which follow. All temperatures are in degrees Fahrenheit unless specified otherwise. All compositions are expressed as percent by weight unless otherwise indicated.

EXAMPLE 1

80 g. of Versar ®300 and 1 g. of octadecyl 3-(3',5'-di-tert-butyl-4'-hydroxyphenyl)-propionate were introduced into a paddletype, center agitator mixer and heated at 275° F. When the mixture had melted enough for stirring, the mixer was started. 25 g. of paraffin wax, 39 g. of an ethylene-acrylic acid copolymer, which contained 85% ethylene and 15% acrylic acid having an acid number of 120, and 8 g. of a vinyl pyrrolidone-vinyl acetate copolymer, which contained 60% vinyl pyrrolidone and 40% vinyl acetate, were added to the mixer. After the foam had started subsiding, 20 g. of Foral ®AX was added and the mixing was continued. Then, 7 g. of the vinyl pyrrolidone-vinyl acetate copolymer and 20 g. of the Foral ®AX were added. When the mixture had started melting, the temperature was lowered to 250° F. and mixing was continued. As soon as the mixture was smoothly blended, the mixture was removed and allowed to cool into blocks, which were then ready to use for the hot melt sizing of warp yarn.

The final composition comprised 40% by weight of the alkenyl succinic anhydride Versar ®300, 12.5% by weight of paraffin wax, 20% by weight of the hydrogenated wood rosin Foral ®AX, 19.5% by weight of the ethylene-acrylic acid copolymer, 7.5% by weight of the vinyl pyrrolidone-vinyl acetate copolymer and 0.5% by weight of the octadecyl 3-(3',5'-di-tertbutyl-4'-hydroxyphenyl)propionate. The composition had a viscosity of 500-750 cps at 250° F. using a Brookfield-Rheolog viscometer with a No. 31 spindle at 60 rpm and a Ring and Ball softening point of 170° F.-185° F. The composition was completely dispersible in a 2% caustic solution at 130° F.-140° F. within two hours.

EXAMPLE 2

60 g. of Versar ®300, 2 g. of distearyl pentaerythritol diphosphite and 10 g. of stearic acid were introduced into a paddle type, center agitator mixer and heated at 275° F. When the mixture had melted enough for stirring, the mixer was started. 36 g. of Paraflint H1 ®, 38 g. of an ethylene-acrylic acid copolymer which contained 95% of ethylene and 5% acrylic acid having an acid number of 40, and 7 g. of vinyl pyrrolidone-vinyl acetate copolymer which contained 60% vinyl pyrrolidone and 40% vinyl acetate were added to the mixer. After the foam had started subsiding, 20 g. of Staybelite ® resin was added and the mixing was continued. Then, 7 g. of the vinyl pyrrolidone-vinyl acetate copolymer and 20 g. of the Staybelite ® resin were added. When the mixture had started melting, the temperature was lowered to 250° F. and mixing was continued. As soon as the mixture had achieved a smooth blend, it was removed and allowed to cool into blocks, which were ready for use in hot melt sizing of warp yarn.

The final composition comprised 30% by weight of the alkenyl succinic anhydride Versar ®300, 18% by weight of the Fischer-Tropsch wax Paraflint H1 ®, 20% by weight of the partially hydrogenated wood rosin Staybelite ® resin, 19% by weight of the ethylene-acrylic acid copolymer, 7% by weight of the vinyl pyrrolidone-vinyl acetate copolymer, 5% by weight of stearic acid and 1% by weight of distearyl pentaerythritol diphosphite. The composition had a viscosity of 250-400 cps at 250° F. using a Brookfield-Rheolog viscometer with a No. 31 spindle at 60 rpm and a Ring and Ball softening point of 215° F.-230° F.

EXAMPLE 3

60 g. of Versar ®300, 1 g. of octadecyl 3-(3',5'-di-tertbutyl-4'-hydroxyphenyl)-propionate, and 10 g. of stearic acid were introduced into a paddle type, center agitator mixer and heated at 275° F. When the mixture was melted enough for stirring, the mixer was started. 36 g. of Paraflint H1 ®, 38 g. of an ethyleneacrylic acid copolymer which contained 95% ethylene and 5% acrylic acid having an acid number of 40 and 7.5 g. of a vinyl acetate-crotonic acid copolymer which contained 90% vinyl acetate and 10% crotonic acid were added to the mixer. After the foam had started subsiding, 20 g. of Staybelite ® resin was added and the mixing was continued. Then, 7.5 g. of the vinyl acetate-crotonic acid copolymer and 20 g. of the Staybelite ® resin were added. When the mixture had started melting, the temperature was lowered to 250° F. and mixing was continued. As soon as the mixture had achieved a smooth blend, it was removed and allowed to cool into blocks, which were ready for use in hot melt sizing of warp yarn.

The final composition comprises 30% by weight of the alkenyl succinic anhydride Versar ®300, 18% of the Fischer-Tropsch wax Paraflint H1 ®, 20% by weight of the partially hydrogenated wood rosin Staybelite ® resin, 19% by weight of the ethylene-acrylic acid copolymer, 7.5% by weight of the vinyl acetate-crotonic acid copolymer, 5% by weight of stearic acid and 0.5% by weight of octadecyl 3-(3',5'-di-tertbutyl-4'-hydroxyphenyl)-propionate. The composition had a viscosity of 50-150 cps at 250° F. using a Brookfield-Rheolog viscometer with a No. 31 spindle at 60 rpm and a Ring and Ball softening point of 210°-235° F.

EXAMPLE 4

The compositions prepared in Examples 1, 2 and 3 were applied to yarn as a hot melt size utilizing a laboratory applicator consisting of a notched applicator roller turning in a reservoir of molten hot melt size. Yarns were fed to the grooves where hot melt size was applied. The application rate was controlled by a doctor roll applied against the grooved pick-up roll and controlling the speed of the pick-up notched roll. Each of the compositions was applied to (a) a cotton/polyester yarn being 35% cotton and 65% polyester, and (b) a polypropylene yarn. The sized yarn in all trials had no loose fibers, exhibited good hold-down, was non-blocking and demonstrated easy removability of the size in a washability test.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A water or dilute alkali dispersible hot melt size comprising 10%–30% by weight of a copolymer of ethylene-acidic monomer, 2%–15% by weight of a water-soluble polymer selected from the group comprising a vinyl pyrrolidone-vinyl acetate copolymer, a vinyl acetate-crotonic acid copolymer, and a homopolymer of vinyl pyrrolidone, 25%–45% by weight of a non-blocking agent, 10%–30% of a tackifying resin, 0%–15% of a carboxylic acid, and 0%–2% of an antioxidant.

2. The hot melt size of claim 1 wherein the acidic monomer is acrylic acid.

3. The hot melt size of claim 2 wherein the non-blocking agent is selected from the group comprising paraffin wax, tallow, microcrystalline waxes, and Fischer-Tropsch waxes.

4. The hot melt size of claim 3 wherein the tackifying resin is a hydrogenated wood rosin, a partially hydrogenated wood rosin, wood gum or tall oil rosin.

5. The hot melt size of claim 4 wherein the carboxylic acid is a dicarboxylic acid or a fatty acid.

6. The hot melt size of claim 5 wherein the carboxylic acid is present in the amount of 1%–15% by weight.

7. A water or dilute alkali dispersible hot melt size comprising 15%–25% by weight of a copolymer of ethylene-acidic monomer, 5%–10% by weight of a water-soluble polymer selected from the group comprising a vinyl pyrrolidone-vinyl acetate copolymer, a vinyl acetate-crotonic acid copolymer, and a homopolymer of vinyl pyrrolidone, 30%–40% by weight of an alkenyl succinic anhydride, 12%–20% by weight of a non-blocking agent, 15%–25% by weight of a tackifying resin, 0%–10% by weight of a carboxylic acid and 0.5%–1.0% of an antioxidant.

8. The hot melt size of claim 7 wherein the acidic monomer is acrylic acid.

9. The hot melt size of claim 8 wherein the non-blocking agent is selected from the group comprising paraffin wax, tallow, microcrystalline waxes, and Fischer-Tropsch waxes.

10. The hot melt size of claim 9 wherein the tackifying resin is a hydrogenated wood rosin, a partially hydrogenated wood rosin, wood gum or tall oil rosin.

11. The hot melt size of claim 10 wherein the carboxylic acid is a dicarboxylic acid or a fatty acid.

12. The hot melt size of claim 11 wherein the carboxylic acid is present in the amount of 1%–10% by weight.

13. A water or dilute alkali dispersible hot melt size comprising 15%–25% by weight of an ethylene-acrylic acid copolymer, 5%–10% by weight of a water-soluble polymer selected from the group comprising a vinyl pyrrolidone-vinyl acetate copolymer, a vinyl acetate-crotonic acid copolymer, and a homopolymer of vinyl pyrrolidone, 30%–40% by weight of an alkenyl succinic anhydride wherein said alkenyl group contains 23–43 carbon atoms, 12%–20% by weight of a non-blocking agent selected from the group comprising paraffin wax, tallow, microcrystalline waxes, and Fischer-Tropsch waxes, 15%–25% by weight of a tackifying resin selected from the group comprising a hydrogenated wood rosin, a partially hydrogenated wood rosin, wood gum or tall oil rosin, 0%–10% by weight of a carboxylic acid selected from the group comprising aliphatic dicarboxylic acids having 5–15 carbon atoms, aromatic dicarboxylic acids having 8–30 carbon atoms, fatty acids of 12–30 carbon atoms, and 0.5%–1.0% by weight of an antioxidant.

14. The hot melt size of claim 13 wherein said carboxylic acid is present in the amount of 1%–10% by weight.

15. Yarn sized with the hot melt size of claim 1.
16. Yarn sized with the hot melt size of claim 7.
17. Yarn sized with the hot melt size of claim 13.
18. Yarn sized with the hot melt size of claim 6.
19. Yarn sized with the hot melt size of claim 12.
20. Yarn sized with the hot melt size of claim 14.

* * * * *